US012347917B2

(12) United States Patent
Tamaru

(10) Patent No.: US 12,347,917 B2
(45) Date of Patent: Jul. 1, 2025

(54) DIRECTIONAL COUPLER

(71) Applicant: Murata Manufacturing Co., Ltd., Kyoto (JP)

(72) Inventor: Ikuo Tamaru, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 203 days.

(21) Appl. No.: 18/353,409

(22) Filed: Jul. 17, 2023

(65) Prior Publication Data

US 2023/0361447 A1 Nov. 9, 2023

Related U.S. Application Data

(63) Continuation of application No. PCT/JP2021/042769, filed on Nov. 22, 2021.

(30) Foreign Application Priority Data

Jan. 29, 2021 (JP) ................................ 2021-013087

(51) Int. Cl.
*H01P 5/18* (2006.01)
*H01P 1/18* (2006.01)

(52) U.S. Cl.
CPC . *H01P 5/18* (2013.01); *H01P 1/18* (2013.01)

(58) Field of Classification Search
CPC .... H01P 5/18; H01P 1/18; H01P 5/184; H01P 1/184; H01P 1/20; H01P 1/203;
(Continued)

(56) References Cited

U.S. PATENT DOCUMENTS 3,895,304 A * 7/1975 Klein ...................... G01S 13/24 327/237
9,502,746 B2 * 11/2016 Fasenfest ................ H01P 5/185
(Continued)

FOREIGN PATENT DOCUMENTS

JP H10-145103 A 5/1998
JP 2014-036345 A 2/2014
(Continued)

OTHER PUBLICATIONS

International Search Report for PCT/JP2021/042769 dated Feb. 8, 2022.

*Primary Examiner* — John W Poos
(74) *Attorney, Agent, or Firm* — McDonald Hopkins LLC

(57) ABSTRACT

A directional coupler splits an input signal received by an input terminal into four signals to be output to output terminals. The directional coupler includes couplers and phase shifters. The coupler is connected to the input terminal and splits the input signal into two signals to be output to terminals. The coupler splits a signal from the terminal into two signals to be output to the output terminals. The coupler splits a signal from the terminal into two signals to be output to the output terminals. The phase shifter is connected between the terminal and the coupler and advances the phase of the signal from the terminal. The phase shifter is connected between the terminal and the coupler and delays the phase of the signal from the terminal. The phase difference between output signals of the phase shifters is 180°±10°.

12 Claims, 7 Drawing Sheets

(58) Field of Classification Search

CPC .... H01P 5/16; H01P 5/227; H01P 5/20; H01P 5/22; H01P 1/387; H01P 1/397; H01P 5/04; H01P 5/12; H01P 9/00; H01P 1/022; H01P 1/10; H01P 1/182; H01P 1/183; H01P 3/08; H01P 5/187; H01P 5/225; H01P 5/182; H01P 5/185; H01P 1/15; H01P 1/209; H01P 1/211; H01P 1/2138; H01P 5/02; H01P 5/181; H01P 5/19; H04B 10/614; H04B 10/5053; H04B 10/50; H04B 10/40; H04B 10/613; H04B 10/61; H04B 10/615; H04B 10/541; H04B 10/505; H04B 10/564; H04B 17/12; H04B 10/29; H04B 10/2914; H04B 10/60; H04B 10/63; H04B 1/58; H04B 10/6162; H04B 10/6165; H04B 2001/045; H04B 1/40; H04B 1/525; H04B 1/0458; H04B 1/18; H04B 10/677; H04B 10/70; H04B 17/21; H04B 7/0617; H04B 1/44; H04B 10/50575; H04B 10/50595; H04B 10/548; H04B 10/67; H04B 7/0408; H04B 1/0057; H04B 1/0483; H04B 1/1607; H04B 1/3827; H04B 1/385; H04B 10/1121; H04B 10/532; H04B 10/6166; H04B 15/00; H04B 17/101; H04B 17/18; H04B 17/382; H04B 2001/0416; H04B 2001/3855; H04B 2001/3861; H04B 7/022; H04B 7/04; H04B 7/0404; H04B 7/086; H04B 7/10; H04B 1/0475; H04B 1/1027; H04B 10/616; H04B 10/66; H04B 1/10; H04B 1/48; H04B 10/00; H04B 10/503; H04B 10/556; H04B 10/65; H04B 3/02; H04B 7/0825; H04B 7/084; H04B 7/0842; H04B 7/0874; H04B 7/0894; H04B 1/1036; H04B 1/123; H04B 1/126; H04B 10/0775; H04B 10/11; H04B 10/272; H04B 10/291; H04B 10/5051; H04B 10/5055; H04B 10/506; H04B 10/516; H04B 10/524; H04B 10/54; H04B 10/802; H04B 10/807; H04B 10/90; H04B 17/11; H04B 17/14; H04B 2001/485; H04B 2210/006; H04B 7/061; H04B 1/00; H04B 1/16; H04B 1/30; H04B 1/401; H04B 1/408; H04B 10/07955; H04B 10/07957; H04B 10/2581; H04B 10/508; H04B 10/5561; H04B 10/5563; H04B 10/612; H04B 2001/0408; H04B 3/06; H04B 7/002; H04B 7/0837

See application file for complete search history.

(56) References Cited

U.S. PATENT DOCUMENTS

| | | | | |
|---|---|---|---|---|
| 2007/0093219 | A1 | 4/2007 | Nakasato et al. | |
| 2014/0043108 | A1 | 2/2014 | Tanaka | |
| 2014/0197901 | A1 | 7/2014 | Bishop et al. | |
| 2015/0236666 | A1* | 8/2015 | Ootsuka | H01P 5/185 333/112 |
| 2017/0040661 | A1* | 2/2017 | Ashida | H01P 5/187 |

FOREIGN PATENT DOCUMENTS

| | | | |
|---|---|---|---|
| JP | 2015-154373 | A | 8/2015 |
| JP | 2016-503278 | A | 2/2016 |
| WO | 2005/055445 | A1 | 6/2005 |

* cited by examiner

DIRECTIONAL COUPLER

CROSS REFERENCE TO RELATED APPLICATION

This is a continuation of International Application No. PCT/JP2021/042769 filed on Nov. 22, 2021 which claims priority from Japanese Patent Application No. 2021-013087 filed on Jan. 29, 2021. The contents of these applications are incorporated herein by reference in their entireties.

BACKGROUND ART

Technical Field

This disclosure relates to a directional coupler and, more particularly, relates to a technology for stabilizing phases between output signals in a four-way coupler.

Japanese Unexamined Patent Application Publication No. 10-145103 (Patent Document 1) discloses a four-phase converter (directional coupler) that outputs an input signal as four signals that are out of phase with each other by 90°.

The four-phase converter disclosed in Patent Document 1 includes a two-wire 90-degree coupler connected to an input terminal and two 180-degree baluns connected, respectively, to the two outputs of the 90-degree coupler. In the four-phase converter disclosed in Patent Document 1, four output signals, which are out of phase with each other by 90°, are output from four output terminals.

Patent Document 1: Japanese Unexamined Patent Application Publication No. 10-145103

BRIEF SUMMARY

In a communication device that transmits and receives radio frequency signals, an array antenna including multiple radiating elements may be used. In such a communication device, a directional coupler as described above may be used to distribute one signal to the multiple radiating elements.

Along with the growing need for a broadband and low-loss communication device, there is a demand for a low-loss directional coupler that can stabilize the phase differences between output signals across a wide frequency band.

This disclosure provides a low-loss four-way directional coupler that can stabilize the phase differences between output signals across a wide frequency band.

A directional coupler according to this disclosure splits an input signal received by an input terminal into four signals to be output to first through fourth output terminals. The directional coupler includes first through third couplers and first and second phase shifters. The first coupler is connected to the input terminal and splits the input signal into two signals to be output to a first terminal and a second terminal. The second coupler splits a signal from the first terminal into two signals to be output to the first output terminal and the second output terminal. The third coupler splits a signal from the second terminal into two signals to be output to the third output terminal and the fourth output terminal. The first phase shifter is connected between the first terminal and the second coupler and advances the phase of the signal from the first terminal. The second phase shifter is connected between the second terminal and the third coupler and delays the phase of the signal from the second terminal. The phase difference between the signal output from the first phase shifter and the signal output from the second phase shifter is 180°±10°.

A directional coupler according to this disclosure has a configuration in which one of output signals of a first coupler connected to an input terminal is provided via a first phase shifter to a second coupler, and the other one of the output signals is provided via a second phase shifter to a third coupler. The two phase shifters are designed such that the phase difference between the output signals is 180°±10°. This configuration in which the phase shifters are disposed in the middle makes it possible to adjust the frequency characteristics of the phase difference between signals input to the second coupler and the third coupler within a desired range. This in turn makes it possible to provide a low-loss four-way directional coupler that can stabilize the phase differences between output signals across a wide frequency band.

DETAILED DESCRIPTION

Figure 1:
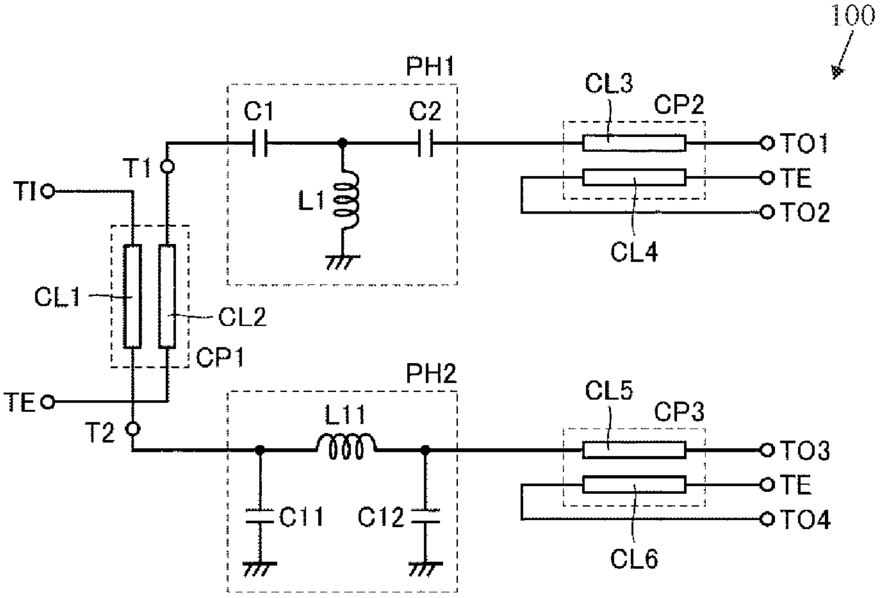
FIG. 1 is a circuit diagram of a directional coupler according to an embodiment.

An embodiment of this disclosure is described in detail below with reference to the drawings. The same reference number is assigned to the same or similar components in the drawings, and the descriptions of those components are not repeated.

[Configuration of Directional Coupler]

FIG. 1 is a circuit diagram of a directional coupler 100 according to an embodiment. Referring to FIG. 1, the directional coupler 100 includes couplers CP1, CP2, and CP3 and phase shifters PH1 and PH2. The directional coupler 100 splits a signal received at an input terminal TI into four signals and outputs the four signals from output terminals 101 through 104. The phase shifter PH1 is connected between the coupler CP1 and the coupler CP2. The phase shifter PH2 is connected between the coupler CP1 and the coupler CP3.

Each of the couplers CP1 through CP3 is a two-wire coupler that includes two parallel lines, splits an input signal into two signals, and outputs the two signals. When the wavelength of a radio frequency signal to be transmitted is λ, each line of each coupler has an electrical length of λ/4. In each coupler, when a signal flows through one of the lines, a signal is induced in another one of the lines due to electromagnetic field coupling.

The coupler CP1 includes a first line CL1 and a second line CL2 that are disposed parallel to each other. In the coupler CP1, one end of the first line CL1 is connected to the input terminal TI, and another end of the first line CL1 is connected to a second terminal on the output side. An end of the second line CL2 facing the end of the first line CL1 closer to the second terminal T2 is connected to an end terminal TE. An end of the second line CL2 facing the end of the first line CL1 closer to the input terminal TI is connected to a first terminal T1. The impedance of the end terminal TE is set at a characteristic impedance of 50Ω. The first terminal T1 of the coupler CP1 is connected to the phase shifter PH1.

The phase shifter PH1 is an LC filter including capacitors C1 and C2 and an inductor L1. The capacitors C1 and C2 are connected in series between the coupler CP1 and the coupler CP2. The inductor L1 is connected between a connection node between the capacitor C1 and the capacitor C2 and the ground potential. That is, the phase shifter PH1 constitutes a so-called T-type high-pass filter.

Accordingly, the phase of an output signal of the phase shifter PH1 is advanced relative to an input signal of the phase shifter PH1.

The coupler CP2 includes a third line CL3 and a fourth line CL4 that are disposed parallel to each other. One end of the third line CL3 is connected to the phase shifter PH1, and another end of the third line CL3 is connected to an output terminal TO1. An end of the fourth line CL4 facing the end of the third line CL3 closer to the phase shifter PH1 is connected to an output terminal TO2. An end of the fourth line CL4 facing the end of the third line CL3 closer to the output terminal TO1 is connected to an end terminal TE.

The phase shifter PH2 is an LC filter including capacitors C11 and C12 and an inductor L11. The capacitor C11 is connected between an end of the inductor L11 closer to the coupler CP1 and the ground potential. The capacitor C12 is connected between an end of the inductor L11 closer to the coupler CP3 and the ground potential. That is, the phase shifter PH2 constitutes a so-called π-type low-pass filter. Accordingly, the phase of an output signal of the phase shifter PH2 is delayed relative to an input signal of the phase shifter PH2. In the directional coupler 100 of the embodiment, the phase shifter PH1 is adjusted such that the phase of the phase shifter PH1 is advanced by 90° relative to the phase shifter PH2.

The coupler CP3 includes a fifth line CL5 and a sixth line CL6 that are disposed parallel to each other. One end of the fifth line CL5 is connected to the phase shifter PH2, and another end of the fifth line CL5 is connected to an output terminal TO3. An end of the sixth line CL6 facing the end of the fifth line CL5 closer to the phase shifter PH2 is connected to an output terminal TO4. An end of the sixth line CL6 facing the end of the fifth line CL5 closer to the output terminal TO3 is connected to an end terminal TE.

Figure 2A:
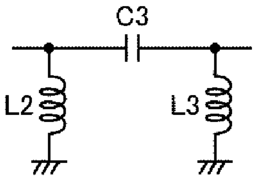
FIGS. 2A and 2B are drawings illustrating variations of a phase shifter.
Figure 2B:
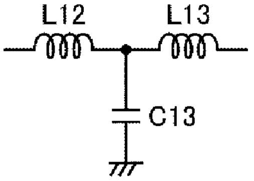

The configurations of the phase shifters PH1 and PH2 are not limited to the configurations described above as long as the phase of the phase shifter PH1 is advanced by 90° relative to the phase of the phase shifter PH2. For example, the phase shifter PH1 may also be configured as a so-called π-type high-pass filter as illustrated in FIG. 2A in which one ends of inductors L2 and L3 are connected to the corresponding ends of a capacitor C3 and other ends of the inductors L2 and L3 are grounded. The phase shifter PH2 may also be configured as a so-called T-type low-pass filter as illustrated in FIG. 2B in which one end of a capacitor C13 is grounded, and another end of the capacitor C13 is connected to a connection node between inductors L12 and L13 that are connected in series.

In the directional coupler 100 with a circuit configuration as described above, when a radio frequency signal is supplied to the input terminal TI, an electric current flows through the first line CL1 from the input terminal TI toward the second terminal T2. As described above, when a signal flows through the first line CL1, a signal is induced in the second line CL2 due to electromagnetic field coupling.

Because the end of the second line CL2 facing the end of the first line CL1 closer to the second terminal T2 is connected to the end terminal TE and the electrical length of each of the lines is λ/4, the phase of the signal induced in the second line CL2 and output from the first terminal T1 is advanced by 90° relative to the signal output from the second terminal T2. Similarly, in the coupler CP2, the phase of a signal output from the output terminal TO2 is advanced by 90° relative to the phase of a signal output from the output terminal TO1. Also, in the coupler CP3, a signal output from the output terminal TO4 is advanced by 90° relative to the phase of a signal output from the output terminal TO3.

Here, in a configuration in which the phase shifters PH1 and PH2 are not provided, when the phase of a signal output by the coupler CP2 from the output terminal TO1 is 0°, a signal with a phase of +90° is output from the output terminal TO2. On the other hand, because a signal with a phase delayed by 90° from the signal input to the coupler CP2 is input to the coupler CP3 from the coupler CP1, a signal with a phase of −90° (i.e., +270°) relative to the signal output from the output terminal TO1 is output from the output terminal TO3, and a signal with a phase of 0° is output from the output terminal TO4. Accordingly, the signal output from the output terminal TO1 is in phase with the signal output from the output terminal TO4. As a result, for example, in an antenna in which separate radiating elements are connected to respective output terminals, a radio wave from the radiating element connected to the output terminal TO1 may interfere with a radio wave from the radiating element connected to the output terminal TO4.

In contrast, in the directional coupler 100 of the embodiment, because the phase shifter PH1 is adjusted such that the phase of the phase shifter PH1 is advanced by 90° relative to the phase shifter PH2, the phase of a signal output from the phase shifter PH1 advances almost 180° in total relative to the phase of a signal output from the phase shifter PH2. With this configuration, when the phase of a signal output from the output terminal TO1 is 0°, a signal with a phase of +90° is output from the output terminal TO2. On the other hand, in the coupler CP3, a signal with a phase of −180° (i.e., +180°) is output from the output terminal TO3, and a signal with a phase of −90° (i.e., +270°) is output from the output terminal TO4. Thus, in the directional coupler 100, signals that are out of phase with each other by 90° are output from the output terminals TO1 through TO4. This configuration makes it possible to prevent the radio wave interference between radiating elements in an antenna in which separate radiating elements are connected to respective output terminals. The phase difference between a signal output from the phase shifter PH1 and a signal output from the phase shifter PH2 does not have to be exactly 180°, and a phase difference of 180°±10° is tolerable. Also, variations of the phase differences between signals output from the output terminals TO1 through TO4 within a range of ±10° are tolerable.

A directional coupler is used in a communication device for transmitting and receiving radio frequency signals to distribute one signal to multiple paths. Meanwhile, there has been a high need for a broadband and low-loss communication device, and this need is particularly growing along with the spread of the 5th generation communication standard (5G).

In a directional coupler, output signals generally have frequency characteristics, and the phases of the output signals may change relative to input signals along with a frequency change. Here, when phase-frequency characteristics of the output signals differ from each other, the phase differences between the output signals may vary, and it may become difficult to achieve desired gain or loss characteristics.

In the four-way directional coupler of the present embodiment, as described above, a phase shifter is provided in each of paths between an input-side coupler and two output-side couplers. The phase shifters make it possible to properly adjust the phase difference between input signals input to the two output-side couplers. This in turn makes it possible to stabilize the phase differences between output signals in a desired pass band.

[Characteristics of Directional Coupler]

Figure 3:
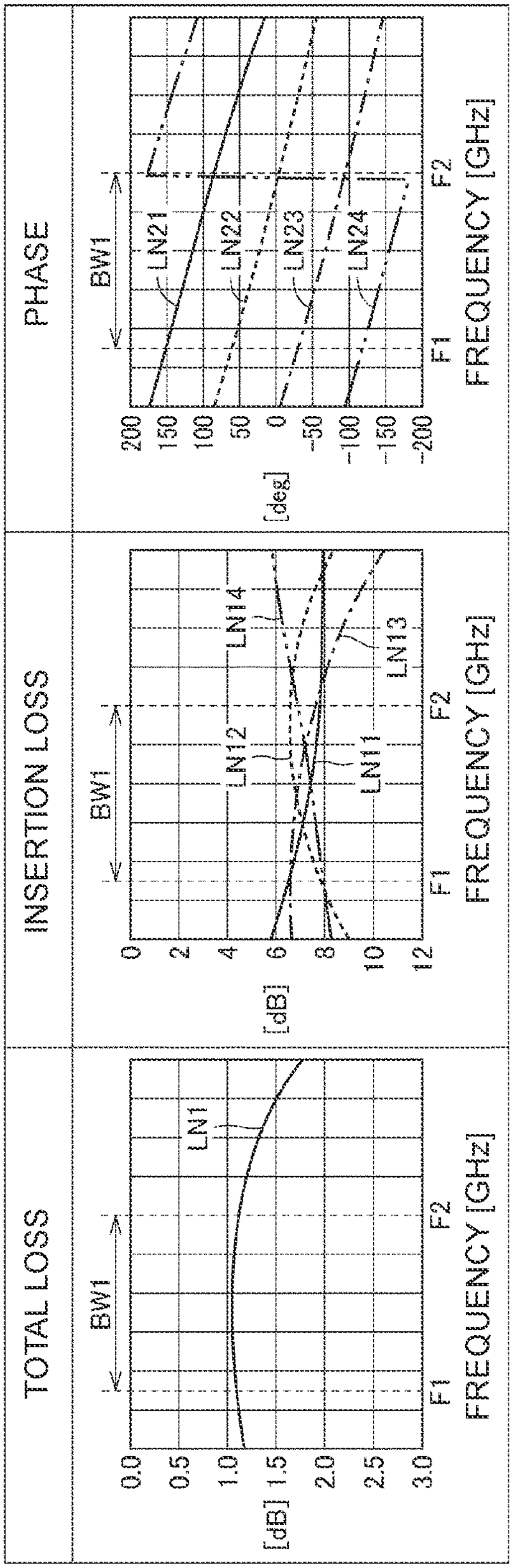
FIG. 3 is a drawing for describing the characteristics of the directional coupler in FIG. 1.

FIG. 3 is a drawing for describing the characteristics of the directional coupler 100 illustrated in FIG. 1. In FIG. 3, the left graph shows the total loss of signals output from all output terminals with respect to an input signal, and the middle graph shows an insertion loss for each of the output terminals. Also, the right graph in FIG. 3 shows the phases of signals output from the output terminals.

In each graph in FIG. 3, the horizontal axis indicates a frequency. The frequency band between F1 and F2 in each graph is a desired pass band BW1. Also, in "insertion loss" (middle graph) and "phase" (right graph), solid lines LN11 and LN21 indicate the output terminal TO1, dotted lines LN12 and LN22 indicate the output terminal TO4, dashed-dotted lines LN13 and LN23 indicate the output terminal TO3, and dashed-two dotted lines LN14 and LN24 indicate the output terminal TO2.

Referring first to "total loss" (left graph) in FIG. 3, within the range of the pass band BW1, the loss is about 1.0 to 1.2 dB (solid line LN1), and low-loss and almost flat characteristics are observed across the entire pass band BW1.

The insertion loss (middle graph) of each of the output terminals is 6 to 8 dB in the pass band BW1, and the output levels of the output signals are substantially the same across the entire pass band BW1. In the pass band BW1, the phase (right graph) of each output signal changes in the delay direction as the frequency increases. However, the slopes of change of the output signals are substantially the same, and the phase differences between the output signals are substantially constant regardless of the frequency.

That is, the directional coupler 100 has such characteristics that across a desired pass band, the loss is low and the phase differences between output signals are substantially constant.

Figure 4:
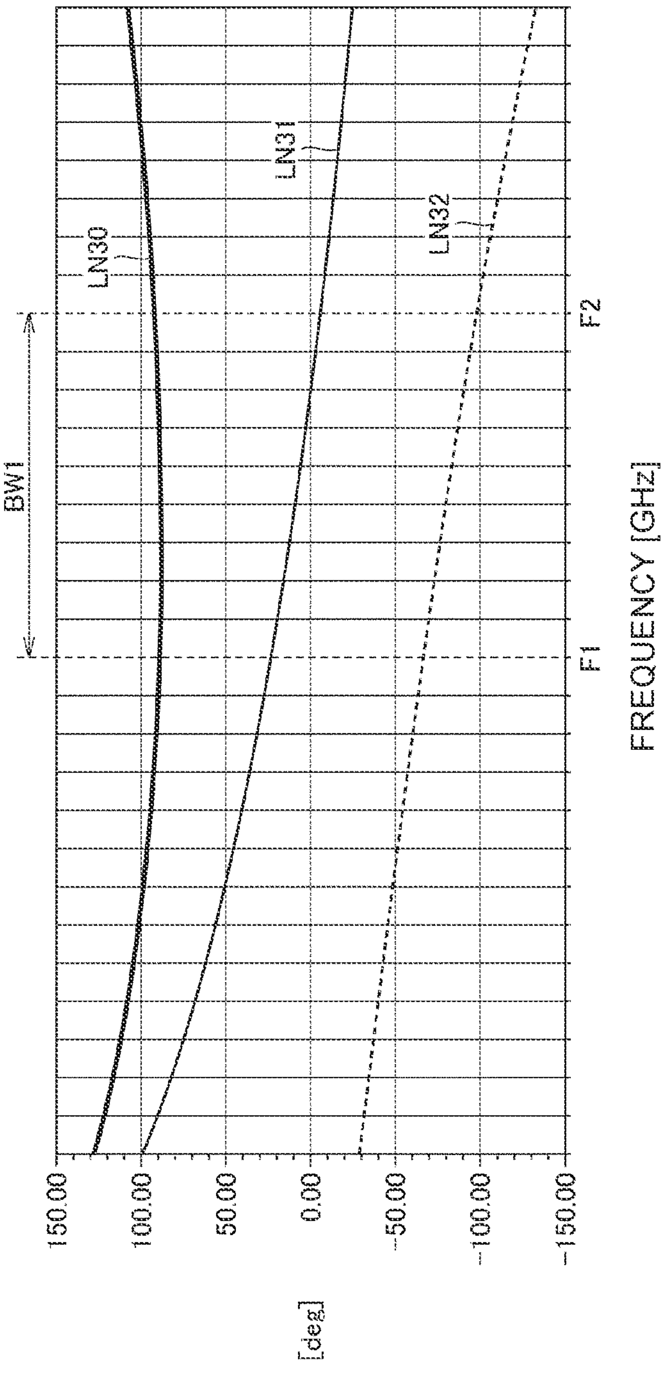
FIG. 4 is a graph for describing the frequency characteristics of phase shifters.

FIG. 4 is a graph for describing the frequency characteristics of the phase shifter PH1 and the phase shifter PH2. In FIG. 4, a solid line LN31 indicates the phase of an output signal of the phase shifter PH1, and a dotted line LN32 indicates the phase of an output signal of the phase shifter PH1. Also, a solid line LN30 indicates the phase difference between the output signals of the phase shifter PH1 and the phase shifter PH2.

Referring to FIG. 4, in the pass band BW1, the phase of each of the phase shifters PH1 and PH2 changes in the delay direction as the frequency increases. However, the phase difference between the phase shifters PH1 and PH2 is substantially constant at about 90° across the entire pass band BW1. Thus, by designing the phase shifters such that the phase difference between the phase shifters PH1 and PH2 becomes substantially 90° in a desired pass band, it is possible to achieve low loss and stabilize the phase differences between output signals in the desired pass band.

[Detailed Configurations of Directional Couplers]

Figure 5:
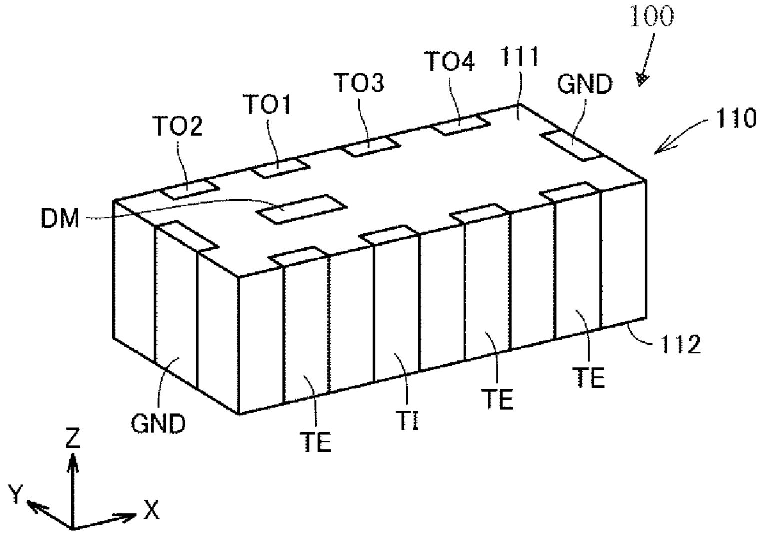
FIG. 5 is an exterior perspective view of the directional coupler in FIG. 1.
Figure 7:
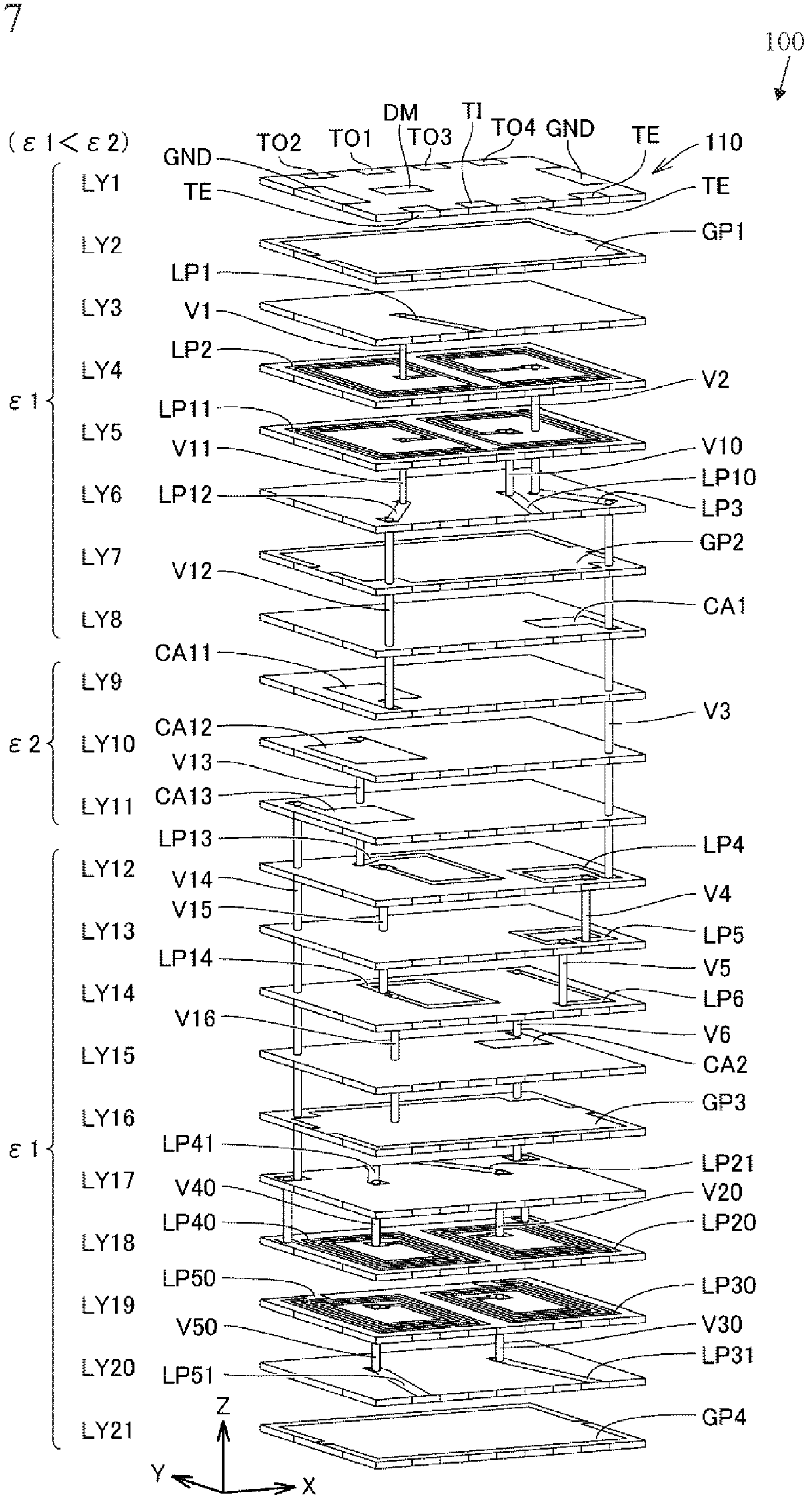
FIG. 7 is an exploded perspective view of an example of a multilayer structure of the directional coupler in FIG. 5.
Figure 8:
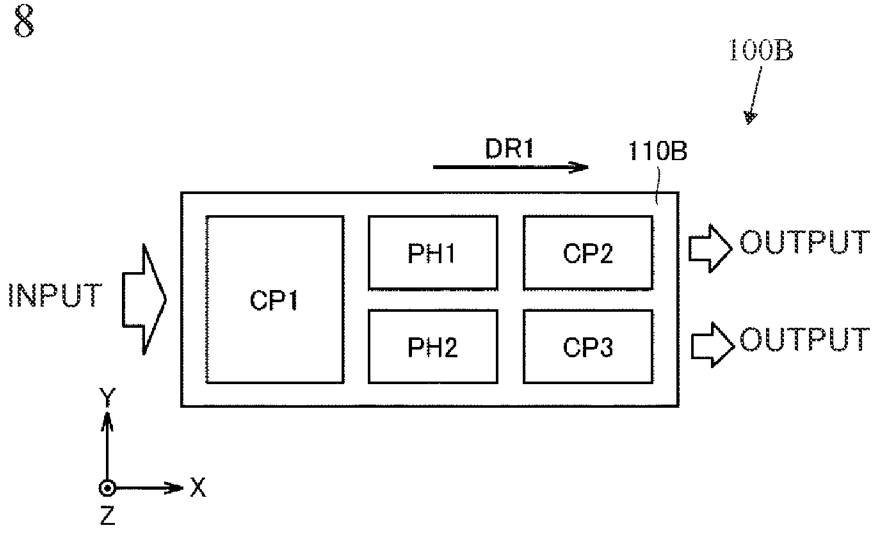
FIG. 8 is a drawing illustrating a first example of a directional coupler with a two-dimensional configuration.
Figure 9:
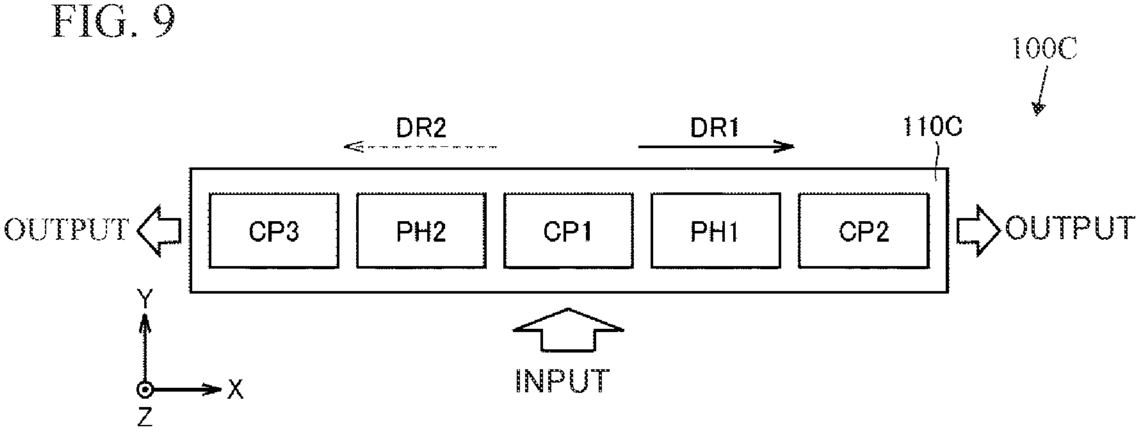
FIG. 9 is a drawing illustrating a second example of a directional coupler with a two-dimensional configuration.
Figure 10:
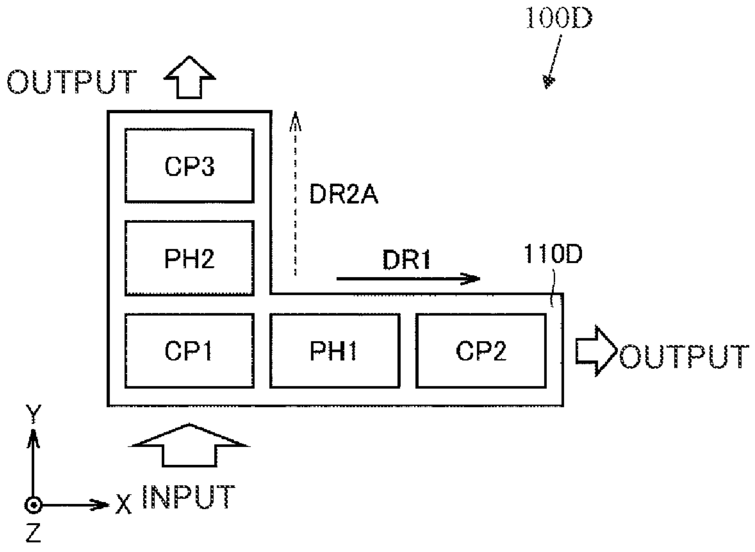
FIG. 10 is a drawing illustrating a third example of a directional coupler with a two-dimensional configuration.

Next, detailed configurations of directional couplers are described with reference to FIGS. 5 through 10. FIGS. 5 through 7 illustrate examples in which elements constituting a directional coupler are three-dimensionally arranged on a substrate. FIGS. 8 through 10 illustrate examples in which elements are two-dimensionally arranged on a substrate.

Examples of Three-Dimensional Configurations

FIG. 5 is an exterior perspective view of the directional coupler 100. Referring to FIG. 5, the directional coupler 100 includes a dielectric substrate 110 that has a multilayer structure and has a cuboid or substantially cuboid shape. As described later with reference to FIG. 7, the dielectric substrate 110 is formed by stacking multiple dielectric layers LY1 through LY21 in a predetermined direction. In the dielectric substrate 110, the direction in which the multiple dielectric layers LY1 through LY21 are stacked is referred to as a stacking direction. Each dielectric layer of the dielectric substrate 110 is formed of a ceramic such as low temperature co-fired ceramics (LTCC) or a resin. In the dielectric substrate 110, inductors and capacitors constituting the couplers CP1 through CP3 and the phase shifters PH1 and PH2 are implemented by multiple electrodes provided in the dielectric layers and multiple vias provided between the dielectric layers. In the present application, "via" indicates a conductor provided in a dielectric layer(s) to connect electrodes provided in different dielectric layers. A via may be formed of, for example, a conductive paste, plating, and/or a metal pin.

In the descriptions below, the stacking direction of the dielectric substrate 110 is referred to as a "Z-axis direction", a direction that is perpendicular to the Z-axis direction and along the long side of the dielectric substrate 110 is referred to as an "X-axis direction", and a direction along the short side of the dielectric substrate 110 is referred to as a "Y-axis direction". Also, in the descriptions below, the positive and negative Z-axis directions in each drawing may be referred to as "upward" and "downward", respectively.

A directional mark DM for identifying the orientation of the substrate is provided on an upper surface 111 of the dielectric substrate 110. Also, the dielectric substrate 110 includes multiple external electrodes each of which has a substantially C-shape and extends from the upper surface 111 via the corresponding side surface of the dielectric substrate 110 to a lower surface 112. The multiple external electrodes includes the input terminal TI, the output terminals TO1 through TO4, the end terminals TE, and ground terminals GND. The dielectric substrate 110 is electrically connected to a mounting board (not shown) via parts of the external electrodes on the lower surface 112 by using connection parts such as solder.

Figure 6A:
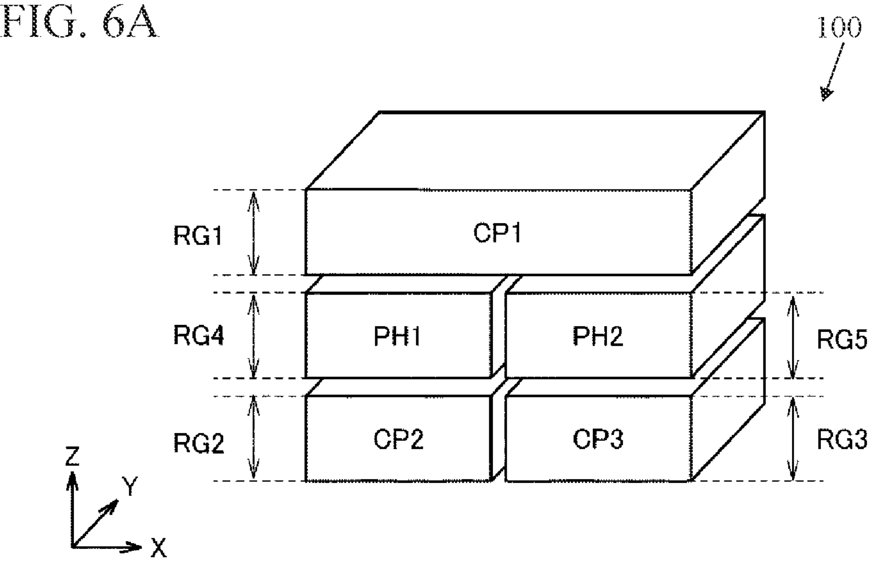
FIG. 6A is a drawing illustrating an example of an arrangement of elements of the directional coupler in FIG. 5.
Figure 6B:
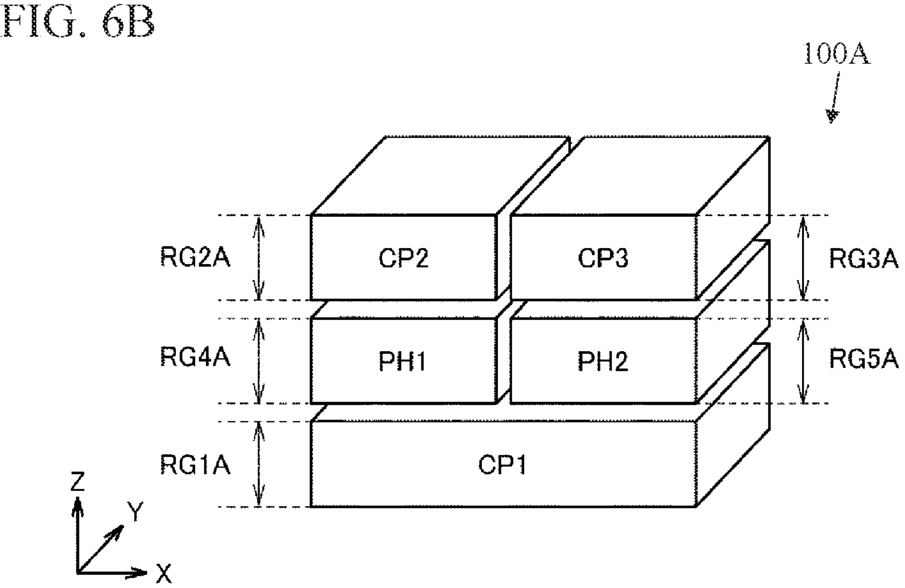
FIG. 6B is a drawing illustrating an example of an arrangement of elements of a directional coupler according to a variation.

FIG. 6A is a schematic diagram illustrating an example of an arrangement of elements of the directional coupler 100 illustrated in FIG. 5. FIG. 6B is a drawing illustrating an example of an arrangement of elements of a directional coupler 100A according to a variation.

In the directional coupler 100 of the embodiment illustrated in FIG. 6A, the input-side coupler CP1 is disposed in a first part RG1 closer to the upper surface 111 of the dielectric substrate 110. The output-side couplers CP2 and CP3 are disposed in a second part RG2 and a third part RG3 closer to the lower surface 112 of the dielectric substrate 110, respectively. The phase shifter PH1 is disposed in a fourth part RG4 located between the coupler CP1 and the coupler CP2 in the stacking direction (the Z-axis direction) of the dielectric substrate 110. The phase shifter PH2 is disposed in a fifth part RG5 located between the coupler CP1 and the coupler CP3 in the stacking direction of the dielectric substrate 110. The fourth part RG4 in which the phase shifter PH1 is disposed may be in the same layer as the fifth part RG5 in which the phase shifter PH2 is disposed, or may be in a different layer from the fifth part RG5.

Elements of the directional coupler 100A of the variation illustrated in FIG. 6B are arranged in the reverse order of the directional coupler 100. That is, the input-side coupler CP1 is disposed in a first part RG1A closer to the lower surface 112 of the dielectric substrate 110. The output-side couplers CP2 and CP3 are disposed in a second part RG2A and a third part RG3A closer to the upper surface 111 of the dielectric substrate 110, respectively. The phase shifter PH1 is disposed in a fourth part RG4A located between the coupler CP1 and the coupler CP2 in the stacking direction of the dielectric substrate 110. The phase shifter PH2 is disposed in a fifth part RG5A located between the coupler CP1 and the coupler CP3 in the stacking direction of the dielectric substrate 110.

In each of the directional couplers 100 and 100A, couplers and phase shifters constituting the directional coupler are arranged and stacked in the Z-axis direction. With this configuration, although the size of the directional coupler in the Z-axis direction slightly increases, the area in plan view of the directional coupler from the Z axis direction decreases. Accordingly, compared with two-dimensional configurations described later with reference to FIGS. 8 through 10, the area of the directional coupler occupied on the mounting board is smaller. Accordingly, it is possible to reduce the size of a circuit including the directional coupler.

FIG. 7 is an exploded perspective view of an example of a multilayer structure of the directional coupler 100 in FIG. 5. As described above, the dielectric substrate 110 has a structure in which multiple dielectric layers LY1 through LY21 are stacked in the Z-axis direction.

The directional mark DM for identifying the orientation of the substrate is provided on the upper surface 111 (the dielectric layer LY1) of the dielectric substrate 110. The ground terminals GND are disposed on the short sides of the dielectric layer LY1; and the input terminal TI, the output terminals TO1 through TO4, and the end terminals TE are disposed on the long sides of the dielectric layer LY1. As illustrated in FIG. 5, each electrode extends via the corresponding side surface of the dielectric substrate 110 to the lower surface 112 (the dielectric layer LY21).

Roughly speaking, the dielectric layers LY3 through LY6 (the first part RG1) constitute the coupler CP1, and the dielectric layers LY17 through LY20 (the second part RG2 and the third part RG3) constitute the couplers CP2 and CP3. The phase shifters PH1 and PH2 are provided in the dielectric layers LY8 through LY15 (the fourth part RG4 and the fifth part RG5). Planar electrodes GP1, GP2, GP3, and GP4 connected to the ground terminals GND are disposed in the dielectric layer LY2, the dielectric layer LY7, the dielectric layer LY16, and the dielectric layer LY21, respectively. In other words, the planar electrode GP2 is disposed between the first part RG1 and the fourth and fifth parts RG4 and RG5, and the planar electrode GP3 is disposed between the second and third parts RG2 and RG3 and the fourth and fifth parts RG4 and RG5.

The planar electrodes GP1 and GP4 are disposed close to the upper surface 111 and the lower surface 112, respectively, and function as shields to reduce the influence of electromagnetic waves from the outside. The planar electrode GP2 is disposed in a layer between the coupler CP1 and the phase shifters PH1 and PH2. The planar electrode GP2 suppresses electromagnetic field coupling between the coupler CP1 and each phase shifter. The planar electrode GP3 suppresses electromagnetic field coupling between the coupler CP2 and the phase shifter PH1 and between the coupler CP3 and the phase shifter PH2.

The input terminal TI is connected to a linear wiring electrode LP1 disposed in the dielectric layer LY3. The wiring electrode LP1 is connected to a via V1 at a position near the center of the dielectric layer LY3 and is connected through the via V1 to one end of a wiring electrode LP2 disposed in the dielectric layer LY4. The wiring electrode LP2 has a coil shape. Another end of the wiring electrode LP2 is connected through a via V2 to one end of a linear wiring electrode LP3 disposed in the dielectric layer LY6. The wiring electrode LP2 corresponds to the first line CL1 of the coupler CP1 in FIG. 1.

A wiring electrode LP11 with a coil shape is disposed in the dielectric layer LY5. One end of the wiring electrode LP11 is connected through a via V10 and a wiring electrode LP10 disposed in the dielectric layer LY6 to the end terminal TE extending along the corresponding side surface of the dielectric substrate 110. Another end of the wiring electrode LP11 is connected through a via V11 to a wiring electrode LP12 disposed in the dielectric layer LY6. The wiring electrode LP11 corresponds to the second line CL2 of the coupler CP1.

The wiring electrode LP11 faces the wiring electrode LP2 disposed in the dielectric layer LY4. The wiring electrodes LP2 and LP11 are arranged such that facing parts are wound in the same direction. The wiring electrode LP2 and the wiring electrode LP11 can be coupled to each other by electromagnetic field coupling.

Another end of the wiring electrode LP12 is connected through a via V12 to a capacitor electrode CA11 disposed in the dielectric layer LY9. In plan view from the Z-axis direction, the capacitor electrode CA11 is disposed to at least partially overlap a capacitor electrode CA12 disposed in the dielectric layer LY10. The capacitor electrode CA11 and the capacitor electrode CA12 constitute the capacitor C1 of the phase shifter PH1 in FIG. 1.

The capacitor electrode CA12 is connected through a via V13 to one end of a wiring electrode LP13 disposed in the dielectric layer LY12. The wiring electrode LP13 has a coil shape. Another end of the wiring electrode LP13 is connected through a via V15 to one end of a wiring electrode LP14 disposed in the dielectric layer LY14. The wiring electrode LP14 has a coil shape. Another end of the wiring electrode LP14 is connected through a via V16 to one end of the planar electrode GP3 disposed in the dielectric layer LY16. The wiring electrodes LP13 and LP14 and the vias V13, V15, and V16 constitute the inductor L1 of the phase shifter PH1.

In plan view from the Z-axis direction, the capacitor electrode CA12 is disposed to also at least partially overlap a capacitor electrode CA13 disposed in the dielectric layer LY11. The capacitor electrode CA12 and the capacitor electrode CA13 constitute the capacitor C2 of the phase shifter PH1.

The capacitor electrode CA13 is connected to a via V14. The via V14 is offset in the dielectric layer LY17 and connected to one end of a wiring electrode LP40 disposed in the dielectric layer LY18. The wiring electrode LP40 has a coil shape. Another end of the wiring electrode LP40 is connected through a via V40 to a wiring electrode LP41 disposed in the dielectric layer LY17. The wiring electrode LP41 is connected to the output terminal TO1 that extends along the corresponding side surface of the dielectric substrate 110. The wiring electrode LP40 corresponds to the third line CL3 of the coupler CP2 in FIG. 1.

A wiring electrode LP50 facing the wiring electrode LP40 and having a coil shape is disposed in the dielectric layer LY19. One end of the wiring electrode LP50 is connected to the output terminal TO2 extending along the corresponding side surface of the dielectric substrate 110. Another end of the wiring electrode LP50 is connected through a via V50 and a wiring electrode LP51 disposed in the dielectric layer LY20 to the end terminal TE extending along the corresponding side surface of the dielectric substrate 110. The wiring electrode LP50 corresponds to the fourth line CL4 of the coupler CP2.

Another end of the wiring electrode LP3 is connected to a via V3 and is connected through the via V3 to a capacitor electrode CA1 in the dielectric layer LY8 and one end of a wiring electrode LP4 disposed in the dielectric layer LY12. In plan view from the Z-axis direction, the capacitor electrode CA1 is disposed to at least partially overlap the planar electrode GP2 disposed in the dielectric layer LY7. The capacitor electrode CA1 and the planar electrode GP2 constitute the capacitor C11 of the phase shifter PH2 in FIG. 1.

The wiring electrode LP4 has a coil shape. Another end of the wiring electrode LP4 is connected through a via V4 to one end of a wiring electrode LP5 disposed in the dielectric layer LY13. The wiring electrode LP5 has a coil shape. Another end of the wiring electrode LP5 is connected through a via V5 to one end of a wiring electrode LP6 disposed in the dielectric layer LY14. The wiring electrode LP6 has a substantially L-shape. Another end of the wiring electrode LP6 is connected through a via V6 to a capacitor electrode CA2 disposed in the dielectric layer LY15. The wiring electrodes LP4 through LP6 and the vias V3 through V6 constitute the inductor L11 of the phase shifter PH2.

In plan view from the Z-axis direction, the capacitor electrode CA2 is disposed to at least partially overlap the planar electrode GP3 disposed in the dielectric layer LY16. The capacitor electrode CA2 and the planar electrode GP3 constitute the capacitor C12 of the phase shifter PH2.

The via V6 is offset in the dielectric layer LY17 and connected to one end of a wiring electrode LP20 disposed in the dielectric layer LY18. The wiring electrode LP20 has a coil shape. Another end of the wiring electrode LP20 is connected through a via V20 to a wiring electrode LP21 disposed in the dielectric layer LY17. The wiring electrode LP21 is connected to the output terminal TO3 that extends along the corresponding side surface of the dielectric substrate 110. The wiring electrode LP20 corresponds to the fifth line CL5 of the coupler CP3 in FIG. 1.

A wiring electrode LP30 facing the wiring electrode LP20 and having a coil shape is disposed in the dielectric layer LY19. One end of the wiring electrode LP30 is connected to the output terminal TO4 that extends along the corresponding side surface of the dielectric substrate 110. Another end of the wiring electrode LP30 is connected through a via V30 and a wiring electrode LP31 disposed in the dielectric layer LY20 to the end terminal TE extending along the corresponding side surface of the dielectric substrate 110. The wiring electrode LP30 corresponds to the sixth line CL6 of the coupler CP3.

The above configuration implements the directional coupler 100 of the embodiment illustrated in FIG. 1.

Here, the capacitors C1 and C2 included in the phase shifter PH1 configured as a high-pass filter require a relatively large capacitance due to their characteristics. However, if the area of a capacitor electrode is increased to increase the capacitance, the parasitic capacitance between the capacitor electrode and a planar electrode for grounding increases. This may cause a decrease in impedance and may rather result in characteristic degradation. Also, if the distance between the capacitor electrode and the planar electrode is increased to reduce the parasitic capacitance, the size of the dielectric substrate in the thickness direction increases, and the downsizing of the dielectric substrate may become difficult.

For the above reasons, in the directional coupler 100 of the embodiment, a permittivity $\varepsilon 2$ of the dielectric layers LY9 through LY11 (the fourth part RG4), in which the capacitor electrodes CA11 through CA13 of the capacitors C1 and C2 of the phase shifter PH1 are disposed, is made greater than a permittivity $\varepsilon 1$ of other dielectric layers (the first part RG1, the second part RG2, and the third part RG3) ($\varepsilon 1<\varepsilon 2$). Compared to a case in which all the dielectric layers have the same permittivity $\varepsilon 1$, setting permittivities as described above makes it possible to set the capacitance of the capacitors included in the phase shifter PH1 to a desired value with a smaller electrode area. As the electrode area decreases, the parasitic capacitance between the capacitor electrode and the planar electrode for grounding decreases, and also the distance between the capacitor electrode and the planar electrode decreases. This in turn makes it possible to suppress characteristic degradation and achieve downsizing.

Examples of Two-Dimensional Configurations

Next, directional couplers with two-dimensional configurations are described. In each two-dimensional configuration, elements constituting a directional coupler are arranged two-dimensionally on a substrate. Each of FIGS. 8 through 10 is a plan view of a dielectric substrate seen from the normal direction (the Z-axis direction). In each of FIGS. 8 through 10, the detailed configurations of the couplers CP1 through CP3 and the phase shifters PH1 and PH2 are omitted, and only a schematic arrangement of elements on a dielectric substrate is illustrated. Each dielectric layer in FIGS. 8 through 10 may have either a single-layer structure or a multilayer structure.

Compared to the directional couplers with the three-dimensional configurations described with reference to FIGS. 6A and 6B, although the mounting area of a directional coupler with a two-dimensional configuration increases, the size in the Z-axis direction of the directional coupler, i.e., the thickness of the dielectric substrate, can be reduced. Accordingly, a two-dimensional configuration is suitable when it is suitable to reduce the height of a directional coupler.

First Example

FIG. 8 is a drawing illustrating a first example of a directional coupler with a two-dimensional configuration. A directional coupler 100B of the first example has a configuration in which signal paths from the input-side coupler CP1 to the output-side couplers CP2 and CP3 are in the same direction.

Referring to FIG. 8, in the directional coupler 100B, the coupler CP1, the phase shifter PH1, and the coupler CP2 are arranged in a positive X-axis direction DR1 (a first direction) on a dielectric substrate 110B with a rectangular shape. In other words, the phase shifter PH1 is disposed between the coupler CP1 and the coupler CP2 in the X-axis direction.

Also, in the directional coupler 100B, the coupler CP1, the phase shifter PH2, and the coupler CP3 are arranged in the first direction on the dielectric substrate 110B. In other words, the phase shifter PH2 is disposed between the coupler CP1 and the coupler CP3 in the X-axis direction.

Second Example

FIG. 9 is a drawing illustrating a second example of a directional coupler with a two-dimensional configuration. The directional coupler 100C of the second example has a configuration in which signal paths from the input-side coupler CP1 to the output-side couplers CP2 and CP3 are in different directions.

Referring to FIG. 9, in the directional coupler 100C, similarly to the directional coupler 100B of the first example, the coupler CP1, the phase shifter PH1, and the coupler CP2 are arranged in the positive X-axis direction DR1 (the first direction) on a dielectric substrate 110C with a rectangular shape.

On the other hand, the coupler CP1, the phase shifter PH2, and the coupler CP3 are arranged on the dielectric substrate 110C in a direction opposite the first direction, i.e., in a negative X-axis direction DR2 (a second direction).

Compared to the directional coupler 100B of the first example, the configuration of the directional coupler 100C makes it possible to reduce the length of the short side of the dielectric substrate. This configuration is suitable for a case in which a directional coupler needs to be placed in an elongated region on a mounting board. Also, in the directional coupler 100C, a first signal path in which a signal from the coupler CP1 is output via the coupler CP2 and a second signal path in which a signal from the coupler CP1 is output via the coupler CP3 are not adjacent to each other on the dielectric substrate 110C. This configuration suppresses coupling between the first signal path and the second signal path and improves the isolation between the first signal path and the second signal path.

Third Example

FIG. 10 is a drawing illustrating a third example of a directional coupler with a two-dimensional configuration. A directional coupler 100D of the third example also has a configuration in which signal paths from the input-side coupler CP1 to the output-side couplers CP2 and CP3 are in different directions.

Referring to FIG. 10, in the directional coupler 100D, a dielectric substrate 110D has a substantially L-shape. In the directional coupler 100D, similarly to the directional coupler 100B of the first example, the coupler CP1, the phase shifter PH1, and the coupler CP2 are arranged in the positive X-axis direction DR1 (the first direction) on the dielectric substrate 110D with a rectangular shape.

On the other hand, the coupler CP1, the phase shifter PH2, and the coupler CP3 are arranged on the dielectric substrate 110D in a direction orthogonal to the first direction, i.e., in a positive Y-axis direction DR2A (a second direction).

The configuration of the directional coupler 100D is suitable for a case in which a region on a mounting board where a directional coupler can be placed has an L-shape. Also, in the directional coupler 100D, a first signal path in which a signal from the coupler CP1 is output via the coupler CP2 and a second signal path in which a signal from the coupler CP1 is output via the coupler CP3 are not adjacent to each other on the dielectric substrate 110D. This configuration suppresses coupling between the first signal path and the second signal path and improves the isolation between the first signal path and the second signal path.

The above-disclosed embodiment should be considered as an example and not restrictive in all respects. The scope of this disclosure is defined by the scope of the claims rather than by the above descriptions of the embodiment and is intended to include all modifications within the scope of the claims and the meaning and scope of equivalents.

REFERENCE SIGNS LIST

100, 100A-100D directional coupler; 110, 110B-110D dielectric substrate; 111 upper surface; 112 lower surface; BW1 pass band; C1-C3, C11-C13 capacitor; CA1, CA2, CA11-CA13 capacitor electrode; CL1-CL6 line; CP1-CP3 coupler; DM directional mark; GND ground terminal; GP1-GP4 planar electrode; L1-L3, L11-L13 inductor; LP1-LP6, LP10, LP11-LP14, LP20, LP21, LP30, LP31, LP40, LP41, LP50, LP51 wiring electrode; LY1-LY21 dielectric layer; PH1, PH2 phase shifter; T1 first terminal; T2 second terminal; TE end terminal; TI input terminal; TO1-TO4 output terminal; V1-V6, V10-V16, V20, V30, V40, V50 via

The invention claimed is:

1. A directional coupler configured to split an input signal into four output signals, the directional coupler comprising:

an input terminal configured to receive the input signal;

first, second, third, and fourth output terminals;

a first coupler that is connected to the input terminal, and that is configured to split the input signal into two signals that are respectively output to a first terminal and a second terminal;

a second coupler configured to split a signal from the first terminal into two signals that are respectively output to the first output terminal and the second output terminal;

a third coupler configured to split a signal from the second terminal into two signals that are respectively output to the third output terminal and the fourth output terminal;

a first phase shifter that is connected between the first terminal and the second coupler, and that is configured to advance a phase of the signal from the first terminal; and a second phase shifter that is connected between the second terminal and the third coupler, and that is configured to delay a phase of the signal from the second terminal, wherein a phase difference between a signal output from the first phase shifter and a signal output from the second phase shifter is 180°±10°.

2. The directional coupler according to claim 1, wherein a phase of a signal output from the first output terminal is 0°, wherein a phase of a signal output from the second output terminal is 90°±10° relative to the signal output from the first output terminal, wherein a phase of a signal output from the third output terminal is 180°±10° relative to the signal output from the first output terminal, and wherein a phase of a signal output from the fourth output terminal is 270°±10° relative to the signal output from the first output terminal.

3. The directional coupler according to claim 1, wherein the first phase shifter is a high-pass filter; and wherein the second phase shifter is a low-pass filter.

4. The directional coupler according to claim 3, wherein the first phase shifter and the second phase shifter are each an LC filter with a T-type structure or a n-type structure.

5. The directional coupler according to claim 1, further comprising:

a dielectric substrate, wherein the first phase shifter, the second phase shifter, and the first, second, and third couplers are on the dielectric substrate.

6. The directional coupler according to claim 5, wherein in plan view of the dielectric substrate from a normal direction of the dielectric substrate:

the first phase shifter is between the first coupler and the second coupler, and the second phase shifter is between the first coupler and the third coupler.

7. The directional coupler according to claim 6, wherein in plan view of the dielectric substrate from the normal direction of the dielectric substrate:

the first coupler, the first phase shifter, and the second coupler are arranged in a first direction, and the first coupler, the second phase shifter, and the third coupler are arranged in the first direction.

8. The directional coupler according to claim 6, wherein in plan view of the dielectric substrate from the normal direction of the normal direction:

the first coupler, the first phase shifter, and the second coupler are arranged in a first direction, and the first coupler, the second phase shifter, and the third coupler are arranged in a second direction different from the first direction.

9. The directional coupler according to claim 1, further comprising:

a dielectric substrate with a multilayer structure, wherein the first coupler is in a first part of the dielectric substrate, wherein the second coupler is in a second part that is different from the first part in a stacking direction of the dielectric substrate, wherein the third coupler is in a third part that is different from the first part in the stacking direction of the dielectric substrate, wherein the first phase shifter is in a fourth part located between the first part and the second part, and wherein the second phase shifter is in a fifth part located between the first part and the third part.

10. The directional coupler according to claim 9, wherein the second part and the third part are located in a same position in the stacking direction of the dielectric substrate.

11. The directional coupler according to claim 9, wherein the dielectric substrate comprises a ground electrode in each of a layer between the first part and the fourth part, a layer between the first part and the fifth part, a layer between the second part and the fourth part, and a layer between the third part and the fifth part.

12. The directional coupler according to claim 9, wherein the first phase shifter is an LC filter comprising a capacitor and an inductor, and wherein a permittivity of the fourth part of the dielectric substrate is greater than a permittivity of the first part, the second part, and the third part of the dielectric substrate.

* * * * *